Patented Aug. 21, 1951

2,564,665

UNITED STATES PATENT OFFICE 2,564,665

INSECT REPELLENTS

Paul D. Bartlett, Weston, Mass., and Gilbert Forrest Woods, Silver Spring, Md., assignors to the United States of America as represented by the Secretary of the Army No Drawing. Application January 7, 1949, Serial No. 69,838

12 Claims. (Cl. 167—30)

This invention relates to insect repellents.

We have found that the application of 1-(2'-hydroxy-cyclohexyl)-1-butanol, a compound having the structural formula

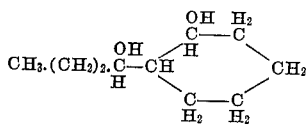

or of its isomer 1-(2'-hydroxy-cyclohexyl)-2-methyl-1-propanol, a compound having the structural formula

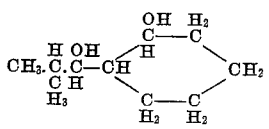

to the human skin affords effective protection against insect bites, by repelling insects, particularly Aedes aegypti and Anopheles quadrimaculatus.

A number of tests to measure the repellency of these compounds against Aedes aegypti was conducted by smearing the compound on the arms of test personnel, who then thrust their arms into cages containing Aedes aegypti. The arms were exposed for 30-minute intervals at 3 minutes each until the first insect bite.

Tests to measure the repellency of these compounds as impregnants for fabric against Aedes aegypti were conducted by uniformly impregnating mercerized cotton hose with the compound at a rate equivalent to 3.3 gms. per sq. ft., drawing the dried hose over the arms of test personnel, who then thrust their covered arms into cages containing Aedes aegypti for 1 to 2 minutes. If no bites or less than 5 bites were received, the tests were repeated each successive day until 5 or more bites during one exposure were received.

It was found that the application of 1-(2'-hydroxy-cyclohexyl)-1-butanol to the skin affords protection against Aedes aegypti for an average of 204 minutes. Against Anopheles quadrimaculatus, an average repellency time of 35 minutes was noted in analogous tests.

It was found that fabric impregnated with 1-(2'-hydroxy-cyclohexyl)-1-butanol remained repellent against Aedes aegypti for over 10 successive days. Fabric impregnated with 1-(2'-hydroxy-cyclohexyl)-2-methyl-1-propanol remained repellent against Aedes aegypti for over 10 successive days and against Anopheles quadrimaculatus for at least 2 successive days.

For ease of application to the skin, the 1-(2'-hydroxy-cyclohexyl)-1-butanol or 1-(2'-hydroxy-cyclohexyl)-2-methyl-1-propanol may be incorporated in a suitable inert liquid or solid carrier such as mineral oil, alcohol, petrolatum, etc.

Having thus described our invention, we claim:

1. An insect-repellent fabric comprising fabric impregnated with a compound selected from the group consisting of 1-(2'-hydroxy-cyclohexyl)-1-butanol and 1-(2'-hydroxy-cyclohexyl)-2-methyl-1-propanol.

2. An insect-repellent fabric comprising fabric impregnated with 1-(2'-hydroxy-cyclohexyl)-1-butanol.

3. An insect-repellent fabric comprising fabric impregnated with 1-(2'-hydroxy-cyclohexyl)-2-methyl-1-propanol.

4. An insect-repellent composition comprising 1-(2'-hydroxy-cyclohexyl)-1-butanol in an inert non-gaseous organic carrier.

5. An insect-repellent composition comprising 1-(2'-hydroxy-cyclohexyl)-2-methyl-1-propanol in an inert non-gaseous organic carrier.

6. An insect repellent composition comprising a compound selected from the group consisting of 1-(2'-hydroxy-cyclohexyl)-1-butanol and 1-(2'-hydroxy-cyclohexyl)-2-methyl-1-propanol in a non-gaseous inert organic carrier.

7. An insect repellent composition according to claim 6, wherein said carrier is alcohol.

8. An insect repellent composition according to claim 6, wherein said carrier is mineral oil.

9. An insect repellent composition according to claim 6, wherein said carrier is petrolatum.

10. A process of repelling insects comprising applying to the region from which the insects are to be repelled a compound being a member of the group consisting of 1-(2'-hydroxy-cyclohexyl)-1-butanol and 1-(2'-hydroxy-cyclohexyl)-2-methyl-1-propanol.

11. A process of repelling insects comprising applying 1-(2'-hydroxy-cyclohexyl)-1-butanol to the region from which the insects are to be repelled.

12. A process of repelling insects comprising applying 1-(2'-hydroxy-cyclohexyl)-2-methyl-1-propanol to the region from which the insects are to be repelled.

PAUL D. BARTLETT.
G. FORREST WOODS.

REFERENCES CITED

The following references are of record in the file of this patent:

UNITED STATES PATENTS

| Number | Name | Date |
| --- | --- | --- |
| 2,400,006 | Jones et al. | May 7, 1946 |

OTHER REFERENCES

Ungnade et al., Preparation of Cyclohexanols from 1944, Chemical Abstracts, vol. 38, pages 957 and 958.